United States Patent
Livesay et al.

(10) Patent No.: US 6,216,835 B1
(45) Date of Patent: Apr. 17, 2001

(54) POWER TROLLEY TOWING DEVICE

(75) Inventors: Mark F. Livesay, Palmyra; Kenneth P. Juhl, Lancaster; Richard J. Troy, Millersville; G. Scott Layman, Leola, all of PA (US)

(73) Assignee: Woodson Incorporated, Lititz, PA (US)

( * ) Notice: Subject to any disclaimer, the term of this patent is extended or adjusted under 35 U.S.C. 154(b) by 0 days.

(21) Appl. No.: 09/377,036

(22) Filed: Aug. 19, 1999

(51) Int. Cl.$^7$ ........................................ B60L 5/00
(52) U.S. Cl. ............... 191/45 R; 191/23 R; 191/12 R; 191/48; 191/50; 191/64; 414/279
(58) Field of Search .................... 191/12 R, 22 R, 191/23 R, 23 A, 29 R, 33 R, 40, 45 R, 48, 49, 50, 56, 59, 59.1, 63, 64; 414/266, 279, 277

(56) References Cited

U.S. PATENT DOCUMENTS

| | | | |
|---|---|---|---|
| 519,380 | * | 5/1894 | Cook .................................. 191/23 R |
| 885,063 | * | 4/1908 | Loudon ................................. 191/50 |
| 1,020,794 | * | 3/1912 | Bluhm .................................. 191/49 |
| 1,413,250 | * | 4/1922 | Wolfe ................................ 191/12 R |
| 1,692,893 | * | 11/1928 | Gutzat ................................. 191/58 |
| 3,514,553 | * | 5/1970 | Penney et al. ....................... 191/56 |
| 3,700,128 | | 10/1972 | Noble et al. . |
| 3,800,963 | | 4/1974 | Holland . |
| 3,805,973 | | 4/1974 | Thompson . |
| 3,850,317 | | 11/1974 | Lumier . |
| 3,905,492 | | 9/1975 | Maeda et al. . |
| 3,921,828 | | 11/1975 | Suizu . |
| 3,964,619 | | 6/1976 | Irmler . |
| 4,338,056 | | 7/1982 | Abrahamson et al. . |
| 4,395,181 | | 7/1983 | Loomer . |
| 4,510,352 | * | 4/1985 | May et al. ............................ 191/64 |
| 4,549,841 | | 10/1985 | Ishige . |
| 4,850,783 | | 7/1989 | Maekawa . |
| 5,324,157 | | 6/1994 | Stolzer . |
| 5,370,492 | | 12/1994 | Gleyze et al. . |
| 5,540,532 | | 7/1996 | Carder et al. . |
| 5,564,890 | | 10/1996 | Knudsen, Jr. . |
| 5,848,867 | | 12/1998 | Gagnon et al. . |

* cited by examiner

Primary Examiner—Mark T. Le
(74) Attorney, Agent, or Firm—James Creighton Wray; Meera P. Narasimhan

(57) ABSTRACT

A power rail is mounted on the face of storage system support columns. The power from the rail is transmitted to the equipment using a right angle, low clearance power rail trolley. The towing device is mounted to the side of the moving equipment. The device incorporates a new low profile trolley and towing arm attachment to permit mounting inches from the floor surface. The towing device includes a pair of pin engagement guide fingers that provide tolerance for traveling misalignments between the moving equipment and the stationary power rail. When an obstruction is encountered, power to drive the traveling stacker-retriever is cut off. The trolley engagement unit is mounted on a lateral swivel arm, the towing arm. The swivel arm mount has a mechanical overload spring pin detent. If a mechanical overload is detected, the swivel arm disengages from the spring pin detent, causing a limit switch to signal an emergency stop condition to disconnect motive power and to stop the moving equipment. Thus both the moving equipment, the trolley and the stationary power rail, are protected from damage. The power trolley towing device is used in a stacker-retriever system that has a process controller connected to a radio frequency modem. The process controller transmits and receives process data that determines what automatic missions are to be performed by the stacker-retriever. The power trolley towing device may be used by any powered equipment or vehicle that moves in a track along the power rail.

11 Claims, 2 Drawing Sheets

POWER TROLLEY TOWING DEVICE

BACKGROUND OF THE INVENTION

The present invention eliminates the need for an overhead festoon system to power and control automated storage and retrieval equipment.

Stacker-retrievers, for example, move in long aisles between fixed racks lifting and depositing loads via carriages that run deep into the racks, depositing and retrieving loads from the racks. Festooning power and communication cords are connected to power lines above the racks. The stacker-retriever must be reinforced to carry the additional weight of the festooned power cable. The festooned power cords create burdens and difficulty.

Needs exist for better power transmission systems.

SUMMARY OF THE INVENTION

The present invention provides a power trolley towing device that eliminates the need for an overhead festoon system to power and control automated storage and retrieval equipment. The power trolley towing device uses a combination of a commercially available power rail with a power trolley and rail. The present invention completely eliminates the need for costly, heavy and cumbersome overhead festooned components. The power trolley towing device is less expensive to build, install, and maintain. Cost savings are realized with the use of the power rail and trolley towing device.

A power rail is mounted on the face of storage system support columns. The power from the rail is transmitted to the equipment using a right angle, low clearance power rail trolley.

A problem exists in that the powerful drive motors in the stacker-retrievers may cause damage to the rail, the power pick-up or the stacker-retriever if misalignments occur or obstructions are encountered.

The towing device is mounted to the side of the moving equipment. The device incorporates a new low profile trolley and towing arm attachment to permit mounting only inches from the floor surface. The towing device includes a pair of pin engagement guide fingers that provide tolerance for traveling misalignments between the moving equipment and the stationary power rail. When an obstruction is encountered, power to drive the traveling stacker-retriever is cut off.

The trolley engagement unit is mounted on a lateral swivel arm, the towing arm. The swivel arm mount has a mechanical overload spring pin detent. If a mechanical overload is detected, the swivel arm disengages from the spring pin detent, causing a limit switch to signal an emergency stop condition to disconnect motive power and to stop the moving equipment. The result is that both the moving equipment, the trolley and the stationary power rail are protected from damage.

The power trolley towing device is used in a stacker-retriever system that has a process controller connected to a radio frequency modem. The process controller transmits and receives process data that determines what automatic missions are to be performed by the stacker-retriever. For example power from the power rail is used to drive X, Y and Z motors to advance a mast and to lift a load carriage toward alignment with a rack location, by concurrently driving X (horizontal) and Y (vertical) motors. After alignment with a rack location, a rack entry vehicle is driven with a Z motor into and out of the rack to deposit or pick up a load. Then the drive sequences are reversed.

The power trolley towing device may be used by any powered equipment or vehicle that moves in a track along the power rail.

A power trolley towing device is used on a vehicle moving on tracks. A three-phase A.C. power rail assembly is mounted along the storage rack to one side of the tracks. A power cable end has brushes connected to busses in the power rail assembly. The power cable is routed through the power trolley, which is supported by the power rail assembly. A towing arm is hinged on a side of the vehicle and extends toward the power rail assembly. The middle of the power cable is connected to the towing arm for supporting the power cable. The towing arm is connected to the power trolley for towing the power trolley along the power rail assembly, thereby supplying motive power from the power rail busses through the power cable to the vehicle.

Detents are connected between the towing arm and the vehicle for releasably maintaining the towing arm extended perpendicularly from the vehicle. Preferably the detents include a peripheries of a disc with a recess for receiving an adjustable spring driven plunger mounted on and extending from a side of the vehicle.

A control-power limit switch is electrically connected to the emergency stop circuit of the stacker-retriever. A cam is connected to the towing arm. This cam turns with the towing arm. A cam following control power limit switch has a base connected to the vehicle and has a plunger extending toward and contacting the cam. The cam and plunger close electrical contacts in the limit switch when the towing arm is extended perpendicularly from the vehicle. When the towing arm turns away from perpendicular, the cam activates the limit switch plunger, opening the electrical contacts. This causes the emergency stop circuit to immediately stop the vehicle.

Trolley engaging fingers are maintained perpendicular to the vehicle by a chain interconnecting fixed and rotating sprockets. The fingers extend from parallel springs which are connected to a plate. The plate is connected to the rotating sprocket at the end of the towing arm. As the towing arm rotates within limits with respect to the vehicle, the fingers disengage from the trolley, because the chain and sprockets turn the fingers with respect to the towing arm.

These and further and other objects and features of the invention are apparent in the disclosure, which includes the above and ongoing written specification.

DETAILED DESCRIPTION OF THE PREFERRED EMBODIMENTS

Figure 1:
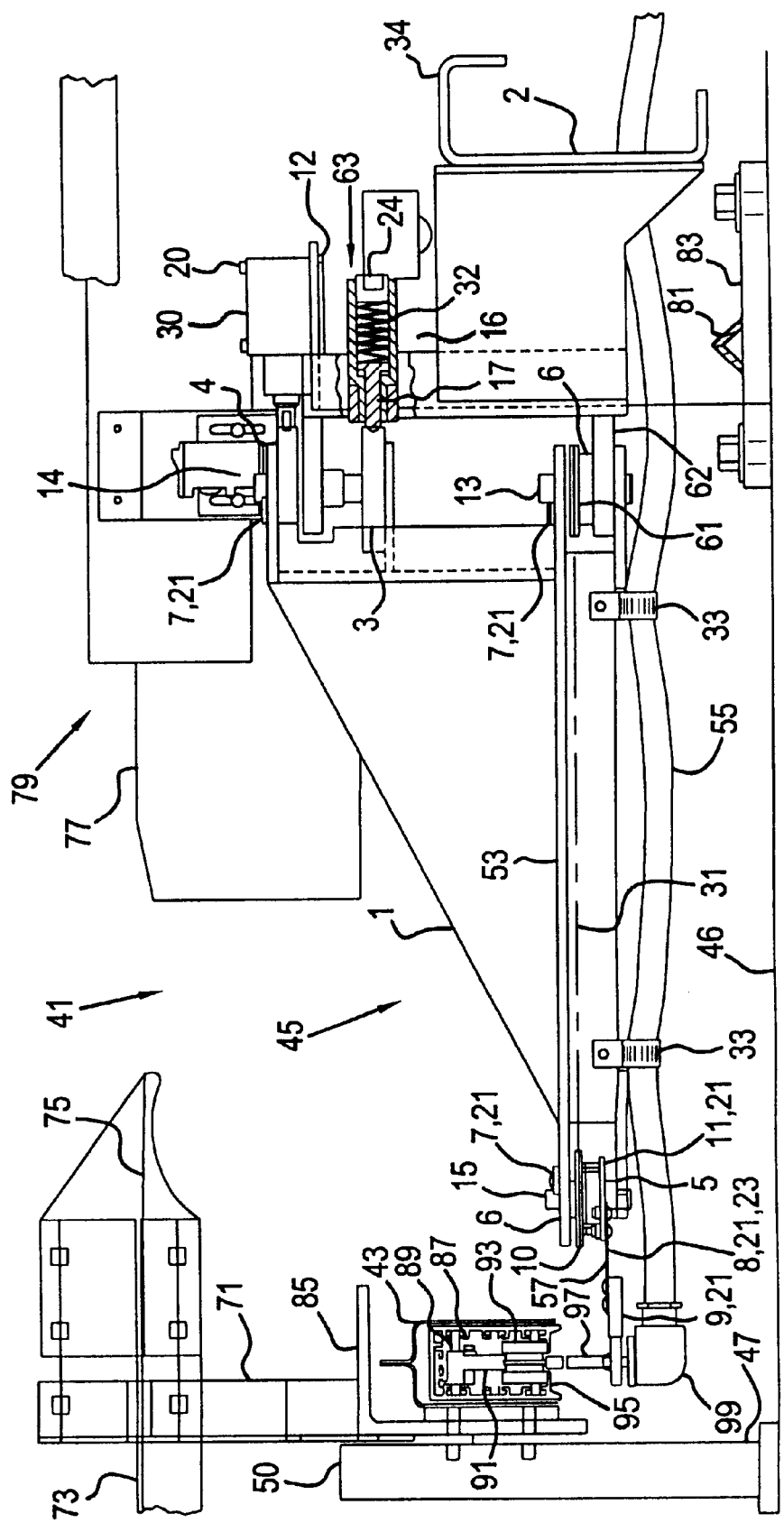
FIG. 1 is an end view of a rack-mounted power rail and a side view of the power rail and power trolley towing device, showing the power trolley and power cable.

The power trolley towing device 45, as shown in FIG. 1, utilizes a combination of commercially available power rail assembly 43 with an exclusive power trolley towing device 45 that completely eliminates the need for costly overhead festoon components. The present invention is less expensive to build, install, and maintain. Significant cost savings are realized with the use of the power trolley towing device 45.

A power rail assembly 43 is mounted a few inches from the floor 46 on the face 47 of storage system support columns 50. Power is supplied through cable 55 to the moving equipment. Hangers 33 secure the cable 55 to the power trolley towing device, 45.

The power trolley towing device 45 is mounted on the side box frame 34 of the moving equipment with a mounting bracket 2. The device 45 has a low profile to permit mounting only inches from the floor surface 46.

The device 45 includes a pair of pin engagement guide fingers 49 that provide tolerance for traveling misalignment between the moving equipment and the stationary power rail assembly 43. Sprockets 10 and 61 and chain 31 maintain the guide fingers 49 parallel with respect to the power rail assembly 43. One sprocket 10 is mounted on pin 15 at the end of swivel beam 53 that extends outward from the pin 13 on the bracket 2. The lower pin 13 holds the device 45 near the power rail assembly 43. The other sprocket 61 is fixed on the extension arm 62 that extends outward from bracket 2 to mount the lower pin 13. Roller chain 31 connects the sprockets.

Figure 2:
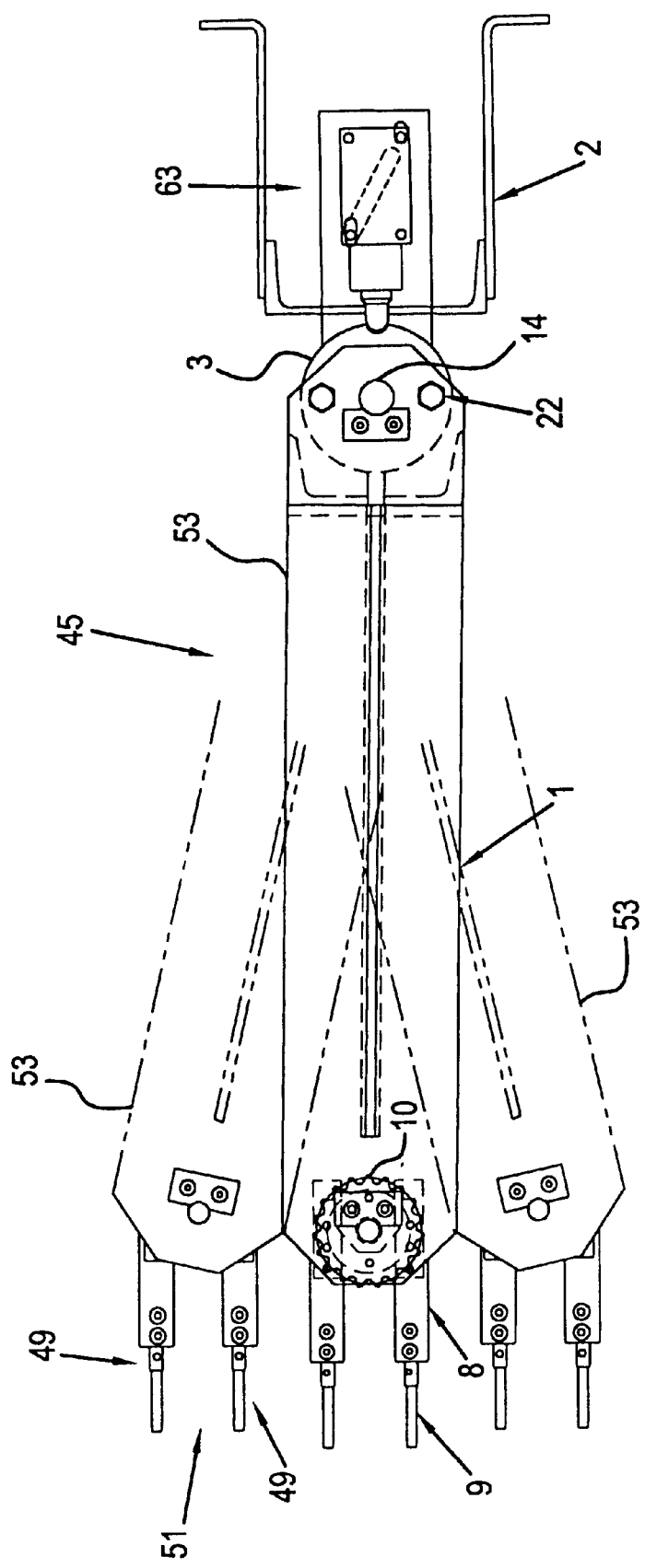
FIG. 2 is a top view of the power rail.

The trolley engagement unit 51 has parallel fingers 49 extending from springs 8 mounted on a swivel plate 11. Plate 57, which is fixed on the outer, rotating sprocket 10, connects the guide engagement unit 51 to the towing arm or swing arm 53. Pin 15 supports the joined guide engagement unit 51, plate 57 and sprocket 10. Pin 15 allows the pin engagement unit 51 to rotate while maintaining the guide fingers 49 parallel with respect to the power trolley 97, as shown in FIG. 2.

During normal operation, power trolley 97 is kept between guide fingers 49. Occasionally, the rolling assembly 97 may tend to lag behind the stacker-retriever, causing increased contact force between the power trolley 97 and the guide fingers 49. Guide fingers 49 are connected to sprocket plate 11 for rotation with the sprocket 10. Sprocket 61 is fixed to extension arm 62. Excessive force against the guide fingers tends to cause rotation of sprocket 10. The attempted rotation of sprocket 10 is imparted through chain 31 to fixed sprocket 61. The chain and fixed sprocket cause sprocket 10 to rotate with respect to the swing arm. Rotation of sprocket 10 maintains guide fingers 49 perpendicular to the vehicle and parallel with respect to roller assembly 97. The guide fingers do not remain parallel to swing arm 53 during its rotational movement.

The device 45 has a mechanical overload detection spring pin device 63. If a mechanical overload is detected by the cam-detent 3, the swing arm 53 disengages causing a limit switch 30 to stop the moving equipment. The result is that both the moving equipment and the stationary power rail 43 are protected from damage.

The storage rack vertical members 71 are attached to the support angles 85. Horizontal members 73 receive and hold loaded pallets. The horizontal rack members have extensions 75 that align with extensible support members 77 on the platform that moves up and down on the stacker-retriever. The rack is tall with many aligned horizontal members to receive and store pallets. The stacker-retriever is equally tall and is supported on rollers moving on guide rails on the floor and above the rack. One type of guide rail 81 is shown on its support 83 which is bolted to the floor 46. Prior art stacker-retrievers used festooned power cords from cantilevered extensions. The festooning cords were expensive, heavy and cumbersome, and might catch on shelf extensions 75 or other obstructions. For that reason the power rail aspect was invented.

A protective angle iron shelf 85 is mounted on the rack support columns 50 and extends toward the aisle to protect the power rail assembly 43 from contact. The power rail assembly 43 has seven inward facing power busses 87 for three-phase operation.

Power is picked up by opposite spring-mounted contactors or brushes 89 on a power cable end 91 that is supported by trolley rollers 93. The rollers 93 are supported on inward extending rails 95. The power trolley 97 supports the elbow 99 at the distal end of power line 55.

The new power trolley towing device is used in a stacker-retriever system that has a process controller connected to a radio frequency modem. The process controller transmits and receives process data that determines what automatic missions are to be performed by the stacker-retriever using the power trolley towing device 45. The stacker-retriever may move forward, stop and reverse according to inputs from the controller.

The power trolley 97 moves with the stacker-retriever. Upon encountering an obstruction or misalignment, the rolling assembly may tend to lag behind the stacker-retriever. Minor lags or advances may be tolerated. Major displacements place undue force on the electrical power transmission equipment or on the stacker. For that reason, the power cut off aspects of the present invention were created.

While the invention has been described with reference to specific embodiments, modifications and variations of the invention may be constructed without departing from the scope of the invention.

We claim:

1. Stacker-retriever warehousing apparatus comprising storage racks having an aisle there between, a stacker-retriever positioned within the aisle and moving between the racks for depositing loads within the racks and retrieving loads from the racks, a three-phase A.C. power rail assembly mounted along a rack, power busses mounted in the power rail assembly, a power trolley supported by the power rail assembly, a power cable having a distal end with brushes in contact with the power busses in the power rail assembly, the power cable distal end being supported on the power trolley, a towing arm hinged on a side of the stacker-retriever and extending toward the power rail assembly, the power cable being connected to the towing arm for supporting the power cable, a towing arm connection extended to the power trolley from the towing arm for towing the power trolley along the power rail assembly with the towing arm and the stacker-retriever thereby supplying motive power from the power busses in the power rail assembly through the power cable to the stacker-retriever.

2. The apparatus of claim 1, further comprising a detent connected between the towing arm and the stacker-retriever for releasably maintaining the towing arm extended perpendicularly from the stacker-retriever.

3. The apparatus of claim 2, further comprising a cam connected to the towing arm, a power switch electrically connected to the power cable and to the stacker-retriever for supplying motive power to the stacker-retriever, a cam following power switch actuator having a base connected to the stacker-retriever and having a plunger extending toward and contacting the cam for closing contacts in the power switch when the cam and towing arm are extended perpendicularly from the stacker-retriever and for opening the contacts in the power switch and cutting off motive power to the stacker-retriever and thereby stopping the stacker-retriever when the towing arm turns away from perpendicular and thereby turns the cam for moving the switch plunger.

4. The apparatus of claim 1, further comprising upper and lower supports extended from the stacker-retriever, axially aligned hinge pins connected to the supports and to the towing arm for hinging the towing arm on the stacker-retriever, a fixed sprocket mounted on one support, a distal pin connected to a distal end of the towing arm remote from the stacker retriever, being a distal pin on the distal end of the towing arm, the distal pin aligned parallel to the hinge pins, a rotating sprocket mounted on the distal pin, the towing arm connection further comprising a plate connected to the rotating sprocket, parallel springs extending outward from the plate perpendicular to the stacker-retriever, parallel power trolley engaging fingers extending outward from the springs for engaging the power trolley and towing the power trolley along the power rail assembly, whereby when force on one of the fingers exceeds a predetermined amount controlled by the detent, the towing arm and cam turn cutting off motive power through the power switch.

5. The apparatus of claim 4, further comprising a roller chain connected to the fixed and rotating sprockets, whereby the sprockets remain angularly related to each other and to the stacker-retriever irrespective of an angle between the towing arm and the stacker-retriever, the fingers remaining generally perpendicular to the stacker-retriever.

6. The apparatus of claim 1, wherein the three-phase A.C. power rail assembly is mounted along the base of a rack on one side of the aisle.

7. A power trolley towing device comprising tracks, a vehicle moving on the tracks, a three-phase power rail assembly mounted along the tracks of on one side of the tracks, a wheeled power trolley supported by the power rail assembly, power busses within the power rail assembly, a power cable, a distal end of the power cable having brushes connected to the power busses in the power rail assembly, the distal end of the power cable being supported by the power trolley, a towing arm hinged on a side of the vehicle and extending toward the power rail assembly, the power cable being connected to the towing arm for supporting the power cable, a towing arm connection extending from the towing arm to the power trolley for towing the power trolley along the power rail assembly, thereby supplying motive power from the power busses in the power rail assembly through the power cable to the vehicle.

8. The apparatus of claim 7, further comprising a detent connected between the towing arm and the vehicle for releasably maintaining the towing arm extended perpendicularly from the vehicle.

9. The apparatus of claim 8, further comprising a cam connected to the towing arm, a power switch having contacts electrically connected to the power cable and to the vehicle for supplying motive power to the vehicle, a cam following power switch actuator having a base connected to the vehicle and having a plunger extending toward and contacting the cam for closing contacts in the power switch when the cam and towing arm are extended perpendicularly from the vehicle and for opening the contacts and cutting off motive power to the vehicle and thereby stopping the vehicle when the towing arm turns away from perpendicular and turns the cam thereby moving the switch plunger.

10. The apparatus of claim 9, further comprising upper and lower supports extended from the vehicle, axially aligned hinge pins connected to the supports and to the towing arm for hinging the towing arm on the vehicle, a fixed sprocket mounted on one support, a parallely aligned distal pin connected to a distal end of the towing arm remote from the vehicle, a rotating sprocket mounted on the distal pin, a plate connected to the rotating sprocket, parallel springs extending from the plate, parallel power trolley engaging fingers extending from the springs for engaging the power trolley and moving the power trolley along the power rail assembly, whereby when force on one of the fingers exceeds a predetermined amount controlled by the detent, the towing arm turns on the hinge pins, turning the cam and allowing movement of the plunger for cutting off motive power through the power switch.

11. The apparatus of claim 10, further comprising a roller chain connected to the fixed and rotating sprockets, whereby the sprockets remain angularly aligned and the fingers remain perpendicular to the vehicle.

* * * * *